United States Patent
Fujita et al.

(10) Patent No.: US 6,741,407 B2
(45) Date of Patent: May 25, 2004

(54) OPTICAL PICKUP AND METHOD OF FIXING A PLATE WITH AN ELECTRONIC COMPONENT

(75) Inventors: Kenichi Fujita, Osaka (JP); Suehiro Harada, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 91 days.

(21) Appl. No.: 10/135,688

(22) Filed: May 1, 2002

(65) Prior Publication Data

US 2002/0172145 A1 Nov. 21, 2002

(30) Foreign Application Priority Data

May 15, 2001 (JP) .................... P2001-144855

(51) Int. Cl.[7] .................. G02B 7/02; B65C 9/25; C09J 5/00
(52) U.S. Cl. ............... 359/819; 359/811; 359/820; 156/322
(58) Field of Search ............... 359/811, 819, 359/820; 396/526; 362/455; 353/100; 428/36; 156/322, 325, 308.4, 314, 272.2, 273.3, 273.5, 275.3, 275.7, 275.1, 290; 369/300

(56) References Cited

U.S. PATENT DOCUMENTS 4,560,457 A * 12/1985 Ogawa ................. 522/11
5,396,061 A * 3/1995 Taniguchi et al. ..... 369/110.04

FOREIGN PATENT DOCUMENTS

JP          62-89249          4/1987

* cited by examiner

*Primary Examiner*—Georgia Epps
*Assistant Examiner*—Joseph Martinez
(74) *Attorney, Agent, or Firm*—Morgan, Lewis & Bockius LLP (57) ABSTRACT

A plate 2 with a photodiode PD is positioned with a slight interval with respect to a housing 1, a small amount of an ultraviolet curing adhesive 8a is applied to four portions each located between a corner of either side edge 2a of the plate 2 and the housing 1, the ultraviolet curing adhesive 8a is allowed to cure by application of ultraviolet rays thereto to temporarily fix the plate 2 to the housing 1, an appropriate amount of a thermosetting adhesive is applied to two portions each located between a central portion of either side edge 2a of the plate 2 and the housing 1, and the thermosetting adhesive 8b is allowed to cure by heating so as to finally fix the plate 2 to the housing 1.

9 Claims, 7 Drawing Sheets

PRIOR ART

FIG.5

PRIOR ART

FIG.6

PRIOR ART

FIG.7A

PRIOR ART

OPTICAL PICKUP AND METHOD OF FIXING A PLATE WITH AN ELECTRONIC COMPONENT

BACKGROUND OF THE INVENTION

The present invention relates to an optical pickup for use in a disk player such as a DVD or a CD and a method of fixing a plate provided with an electronic component such as a photodiode. More particularly, the present invention concerns a technique whereby the fixation of the plate can be effected speedily and accurately.

Figure 5:
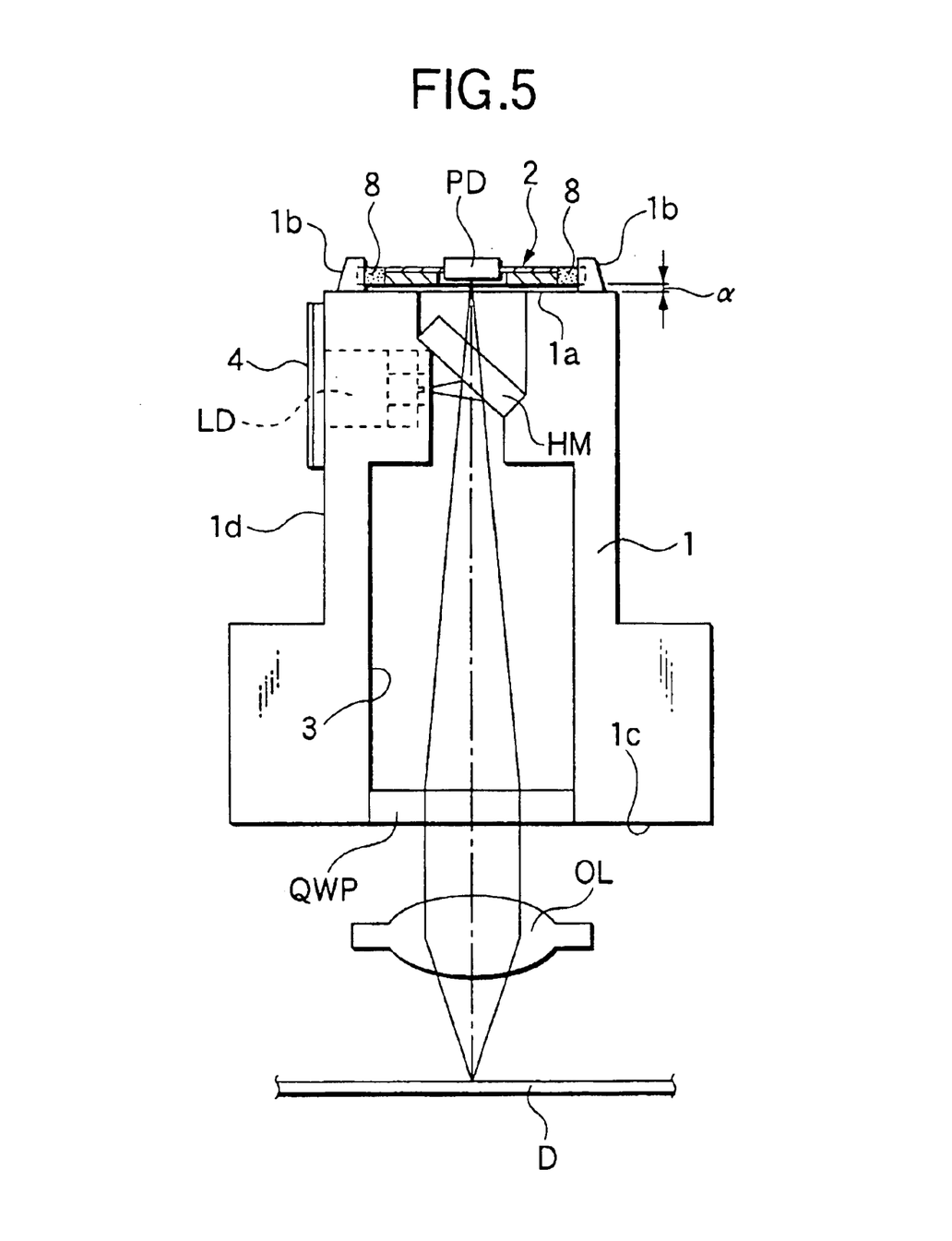
FIG. 5 is a schematic vertical cross-sectional view explaining the operating principle of the optical pickup.

Conventionally, a technique disclosed in the Unexamined Japanese Patent Application Publication No.Sho62-89249 and the like is known as a technique concerning an optical pickup. One of its examples will be described with reference to FIG. 5. In this optical pickup, a bilateral pair of projecting portions 1b are projectingly provided integrally on one end face 1a of a housing 1, and a plate 2 with a photodiode PD is fixed between the two projecting portions 1b. A collimator lens QWP and an objective lens OL are disposed on the other end face 1c side of the housing 1, a half mirror HM is disposed in an inclined state in a groove portion 3 of the housing 1, and a plate 4 with a semiconductor laser LD is fixed to a side surface 1d of the housing 1. Laser light is projected onto a disk D from the semiconductor laser LD through the half mirror HM, the collimator lens QWP, and the objective lens OL, and the light reflected therefrom is received by the photodiode PD through the half mirror HM, thereby reading information recorded in the disk D.

Figure 6:
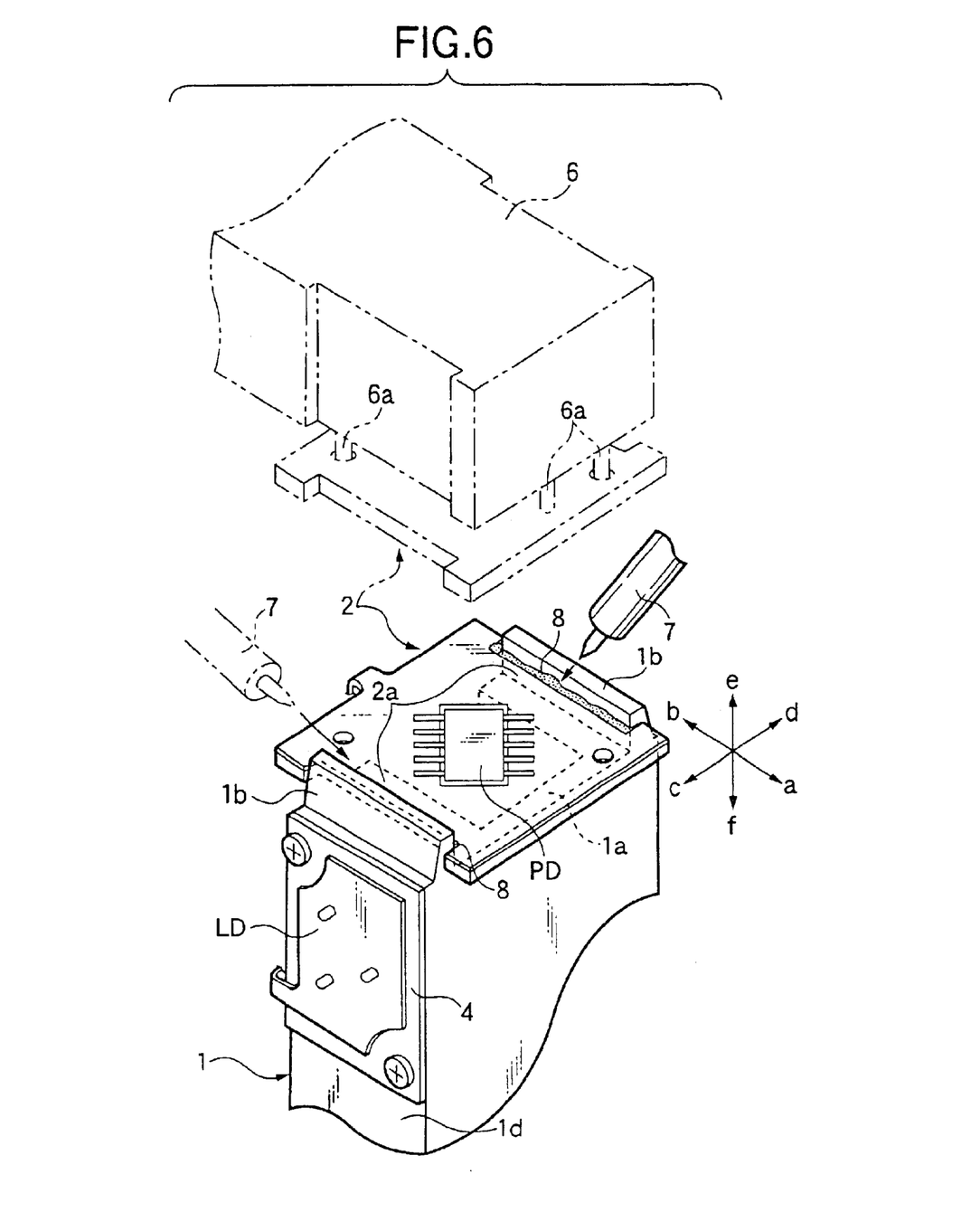
FIG. 6 is a perspective view illustrating essential portions of the optical pickup.
Figure 7A:
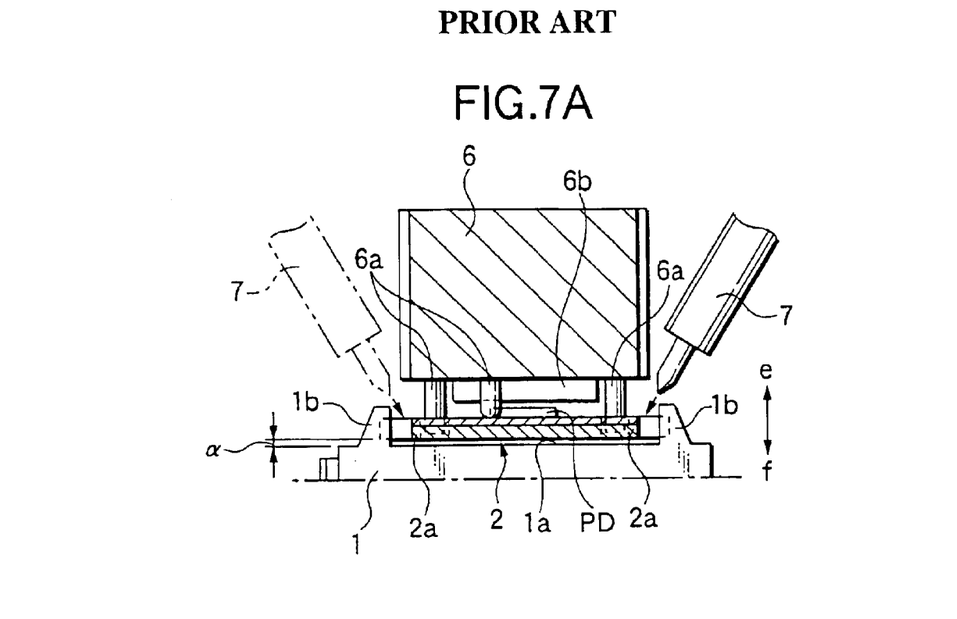
FIG. 7A is a vertical cross-sectional view illustrating a conventional example.
Figure 7B:
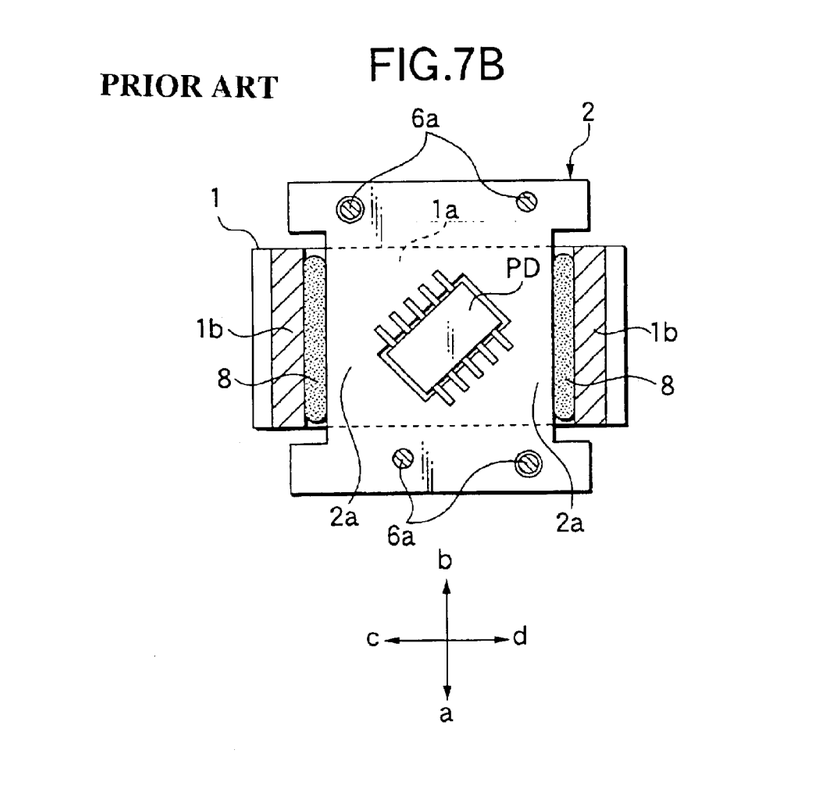
FIG. 7B is a fragmentary plan view thereof.

A description will be given of the procedure of fixing the plate 2 with the photodiode PD in the above-described arrangement. As shown by the phantom lines in FIG. 6, the plate 2 is attracted to a permanent magnet 6b (see FIG. 7A) provided on a lower surface of a distal end of a positioning arm 6, and is retained by a plurality of pins 6a provided projectingly on the lower surface of the distal end of the arm 6. As the positioning arm 6 is moved in three-dimensional directions a to f in the back-and-forth, left-and-right, and vertical directions, the plate 2 is positioned between the two projecting portions 1b with a predetermined interval α from the end face 1a of the housing 1, as shown in FIG. 7A, so as to align the center of the photodiode PD with the axis of the objective lens OL. Next, as shown in FIG. 7B, by means of an applicator 7 an adhesive 8 is applied to two gaps which are each formed between either side edge 21 of the plate 2 and the housing 1. The adhesive 8 is allowed to cure so as to fix the plate 2 to the housing 1, and the positioning arm 6 is raised to move the pins 6a away from the plate 2.

Conventionally, as the aforementioned adhesive 8, an ultraviolet curing adhesive is generally used, and the ultraviolet curing adhesive is applied over each entire range between either side edge 2a of the plate 2 and the housing 1, as shown in FIG. 7B.

With the above-described conventional arrangement, as the ultraviolet curing adhesive applied over each entire range between either side edge 2a of the plate 2 and the housing 1 is allowed to cure instantly by the application of ultraviolet rays thereto, there is an advantage that the plate 2 can be fixed to the housing 1 in a short time. However, since the degree of shrinkage of the ultraviolet curing adhesive due to temperature change is large, there is a possibility that the center of the photodiode PD becomes positionally offset from the axis of the objective lens OL.

Accordingly, it is conceivable to use as the adhesive 8 a thermosetting adhesive whose degree of shrinkage due to the temperature change is small, and to apply the thermosetting adhesive over each entire range between either side edge 2a of the plate 2 and the housing 1. With the thermosetting adhesive, however, since it takes time to heat and cure the hat curing adhesive, it is necessary to maintain the support of the plate 2 by the positioning arm 6 for a relatively long time, so that this method lacks mass productivity.

In view of the above-described conventional drawbacks, the object of the invention is to provide an optical pickup which makes it possible to speedily and accurately fix a plate provided with an electronic component such as a photodiode, as well as a method of fixing a plate with an electronic component.

SUMMARY OF THE INVENTION

To attain the above object, the invention according to aspect 1 is characterized in that a plate with a photodiode is positioned with a slight interval with respect to a housing, that a small amount of an ultraviolet curing adhesive is applied between either side edge of the plate and the housing, that the ultraviolet curing adhesive is allowed to cure by application of ultraviolet rays thereto to temporarily fix the plate to the housing, that an appropriate amount of a thermosetting adhesive is applied between a central portion of the either side edge of the plate and the housing, and that the thermosetting adhesive is allowed to cure by heating so as to finally fix the plate to the housing.

According to the above-described construction, since the plate with a photodiode is temporarily fixed to the housing by the ultraviolet curing adhesive, there is no need to support the plate at the time of final fixation by the thermosetting adhesive, so that it is possible to overcome the drawback of the thermosetting adhesive that it takes time to cure. In addition, since the amount of ultraviolet curing adhesive applied can be reduced by the portion by which the thermosetting adhesive is applied, it is possible to overcome the drawback of the ultraviolet curing adhesive that the degree of shrinkage due to the temperature change is large. Thus by the combination of the two adhesives, the drawbacks of the two adhesives can be overcome, and the fixation of the plate with the photodiode to the housing can be effected speedily and accurately.

Further, since the four corners of the plate can be temporarily fixed positively to the housing by the ultraviolet curing adhesive, and the thermosetting adhesive is applied between the cured ultraviolet curing adhesive portions, the efflux of the thermosetting adhesive to the outside can be reliably prevented, and the plate can be finally fixed firmly to the housing.

The invention according to aspect 2 is characterized in that a plate with a electronic component is positioned with a slight interval with respect to a housing, that a small amount of an ultraviolet curing adhesive is applied between the plate and the housing, that the ultraviolet curing adhesive is allowed to cure by application of ultraviolet rays thereto to temporarily fix the plate to the housing, that an appropriate amount of a thermosetting adhesive is applied between the plate and the housing, and that the thermosetting adhesive is allowed to cure by heating so as to finally fix the plate to the housing.

According to the above-described construction, since the plate with an electronic component is temporarily fixed to the housing by the ultraviolet curing adhesive, there is no need to support the plate at the time of final fixation by the thermosetting adhesive, so that it is possible to overcome the drawback of the thermosetting adhesive that it takes time to cure. In addition, since the amount of ultraviolet curing adhesive applied can be reduced by the portion by which the thermosetting adhesive is applied, it is possible to overcome the drawback of the ultraviolet curing adhesive that the degree of shrinkage due to the temperature change is large. Thus by the combination of the two adhesives, the drawbacks of the two adhesives can be overcome, and the fixation of the plate with the electronic component to the housing can be effected speedily and accurately.

The invention according to aspect 3 is characterized in that, in the optical pickup according to aspect 2, the ultraviolet curing adhesive is applied to a plurality of portions at predetermined intervals between either side edge of the plate and the housing, and that the thermosetting adhesive is applied to gaps other than portions where the ultraviolet curing adhesive has been applied between the either side edge of the plate and the housing.

According to the above-described construction, since a plurality of portions of either side edge of the plate are temporarily fixed firmly to the housing by the ultraviolet curing adhesive, the plate can be positively supported so as not to move unexpectedly while the thermosetting adhesive applied for final fixation is allowed to cure.

The invention according to aspect 4 is characterized in that, in the optical pickup according to aspect 2, the ultraviolet curing adhesive is applied a central portion of either side edge of the plate and the housing, and that the thermosetting adhesive is applied between each corner portion of the either side edge of the plate and the housing.

According to the above-described construction, since only the central portions of the side edges of the plate are temporarily fixed to the housing by the ultraviolet curing adhesive, and the amounts of the ultraviolet curing adhesive applied are very small, it is possible to reliably overcome the drawback peculiar to the ultraviolet curing adhesive that the degree of shrinkage due to the temperature change is large.

The invention according to aspect 5 is characterized by comprising the steps of: positioning a plate with an electric component at a predetermined interval from a housing as a positioning arm retaining the plate is moved in three-dimensional directions including back-and-forth, left-and-right, and vertical directions; applying a small amount of an ultraviolet curing adhesive between either side edge of the plate and the housing; allowing the ultraviolet curing adhesive to cure by application of ultraviolet rays thereto to temporarily fix the plate to the housing; moving the positioning arm from the plate; applying an appropriate amount of a thermosetting adhesive to gaps other than portions where the ultraviolet curing adhesive has been applied between the either side edge of the plate and the housing; and allowing the thermosetting adhesive to cure by heating so as to finally fix the plate to the housing.

According to the above-described construction, before the plate with the electronic component is finally fixed to the housing by the thermosetting adhesive, the plate is temporarily fixed by the ultraviolet curing adhesive in a state in which the plate is supported by the positioning arm. After the temporary fixation, the positioning arm can be immediately moved away from the plate, and it is unnecessary to maintain the support of the plate by the positioning arm until the curing of the thermosetting adhesive in a conventional manner, so that this arrangement excels in mass productivity. In addition, since the amount of the ultraviolet curing adhesive applied can be reduced by the portion by which the thermosetting adhesive is applied, it is possible to overcome the drawback of the ultraviolet curing adhesive that the degree of shrinkage due to the temperature change is large. Thus by the combination of the two adhesives, the drawbacks of the two adhesives can be overcome, and the fixation of the plate with the electronic component to the housing can be effected speedily and accurately.

DETAILED DESCRIPTION OF THE PREFERRED EMBODIMENTS

Figure 1A:
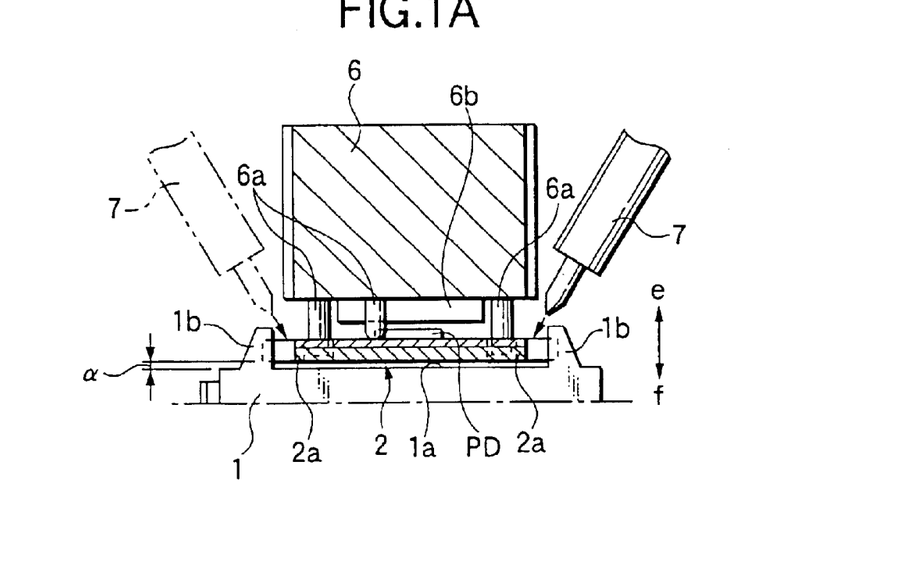
FIG. 1A is a vertical cross-sectional view illustrating a first half of the procedure of fixing a plate with a photodiode in an optical pickup in accordance with an embodiment of the invention.
Figure 1B:
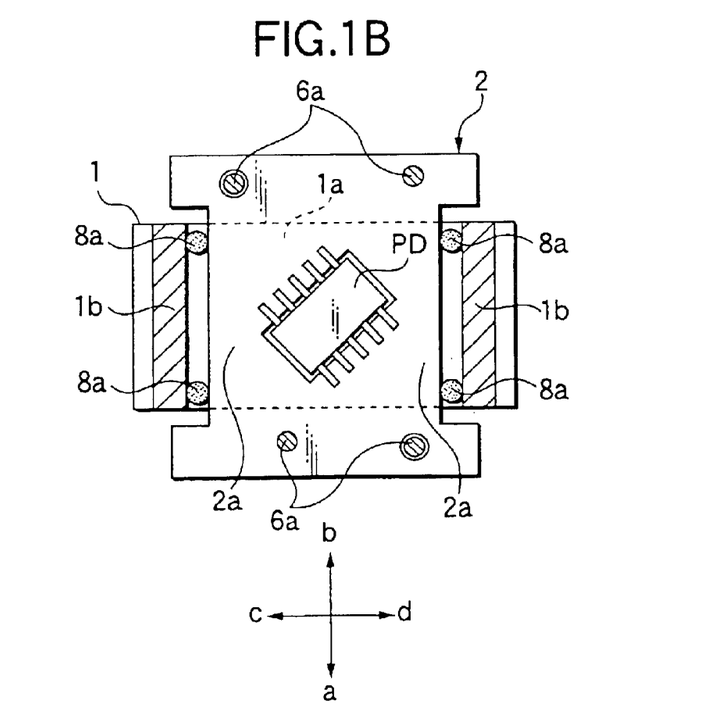
FIG. 1B is a fragmentary plan view thereof.
Figure 2A:
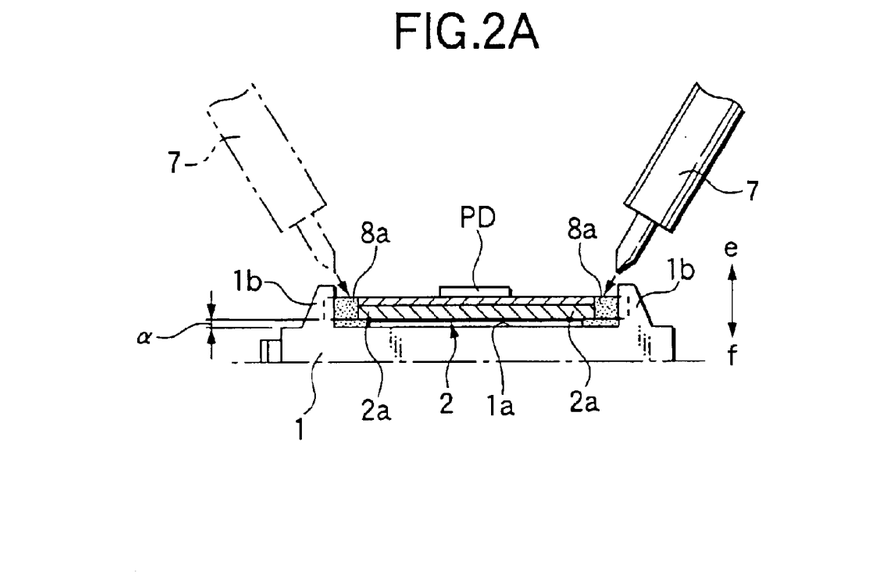
FIG. 2A is a vertical cross-sectional view illustrating a second half of the fixing procedure.
Figure 2B:
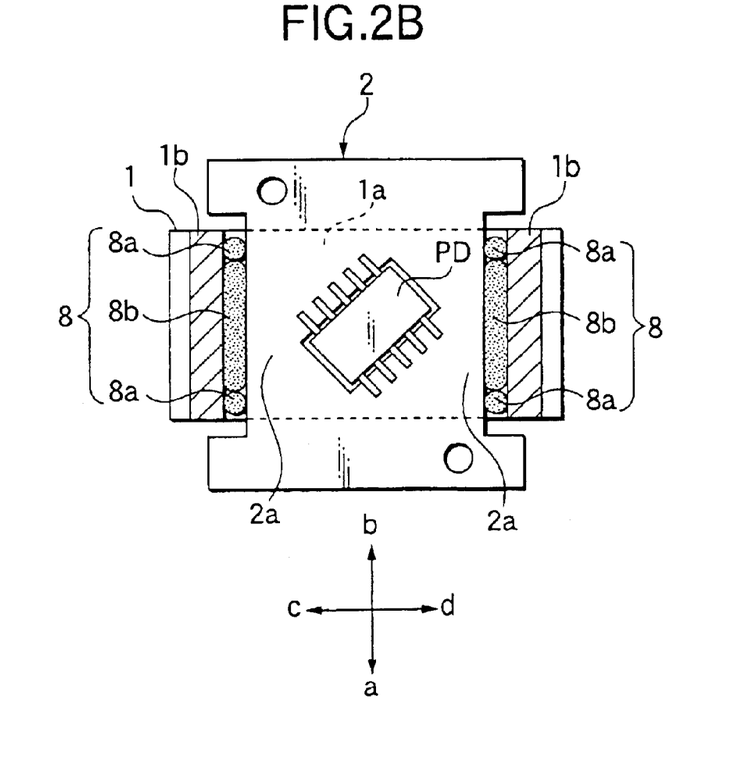
FIG. 2B is a fragmentary plan view thereof.

FIGS. 1 and 2 illustrate a state in which a plate 2 with a photodiode (electronic component) PD in an optical pickup in accordance with an embodiment of the invention is fixed. The plate 2 is fixed to one end face 1a of a housing 1 by means of an adhesive 8 consisting of an ultraviolet adhesive 8a and a thermosetting adhesive 8b. Since arrangements other than those described above are substantially similar to those shown in FIGS. 5 to 7B, identical portions will be denoted by the same reference numerals, and a description thereof will be omitted.

A description will be given of the procedure of fixing the plate 2 with the photodiode PD in the above-described arrangement. As shown by the phantom lines in FIG. 6, the plate 2 is attracted to a permanent magnet 6b (see FIG. 1A) provided on a lower surface of a distal end of a positioning arm 6, and is retained by a plurality of pins 6a provided projectingly on the lower surface of the distal end of the arm 6. As the positioning arm 6 is moved in three-dimensional directions a to f in the back-and-forth, left-and-right, and vertical directions, the plate 2 is positioned between the two projecting portions 1b with a predetermined interval α from the end face 1a of the housing 1, as shown in FIG. 1A, so as to align the center of the photodiode PD with the axis of the objective lens OL. Next, as shown in FIGS. 1A and 1B, by means of an applicator 7 small amounts of the ultraviolet curing adhesive 8a are applied to four spots each located between a corner of either side edge 2a of the plate 2 and each projecting portion 1b. The ultraviolet curing adhesive 8a is allowed to cure by application of ultraviolet rays thereto to temporarily fix the plate 2 to the housing 1, and the positioning arm 6 is subsequently raised to move the pins 6a away from the plate 2. Then, as shown in FIGS. 2A and 2B, appropriate amounts of the thermosetting adhesive 8b are applied to two portions each located between a central portion of either side edge 2a of the plate 2 and each projecting portion 1b, and the thermosetting adhesive 8b is allowed to cure by heating so as to finally fix the plate to the housing 1.

According to the above-described construction, before the plate 2 with the photodiode PD is finally fixed to the housing 1 by the thermosetting adhesive 8b, the plate 2 is temporarily fixed by the ultraviolet curing adhesive 8a in the state in which the plate 2 is supported by the positioning arm 6. After the temporary fixation, the positioning arm 6 can be immediately moved away from the plate 2, and it is unnecessary to maintain the support of the plate 2 by the positioning arm 6 until the curing of the thermosetting adhesive 8b, as has been the conventional case, so that this arrangement excels in mass productivity. In addition, since the amount of the ultraviolet curing adhesive 8a applied can be reduced by the portion by which the thermosetting adhesive 8b is applied, it is possible to overcome the drawback of the ultraviolet curing adhesive 8a that the degree of shrinkage due to the temperature change is large. Thus by the combination of the two adhesives 8a and 8b, the drawbacks of the two adhesives 8a and 8b can be overcome, and the fixation of the plate 2 with the photodiode PD to the housing 1 can be effected speedily and accurately.

Further, since the four corners of the plate 2 can be temporarily fixed positively to the housing 1 by the ultraviolet curing adhesive 8a, and the thermosetting adhesive 8b is applied between the cured ultraviolet curing adhesive 8a portions, the efflux of the thermosetting adhesive 8b to the outside can be reliably prevented, and the plate 2 can be finally fixed firmly to the housing 1.

Figure 3A:
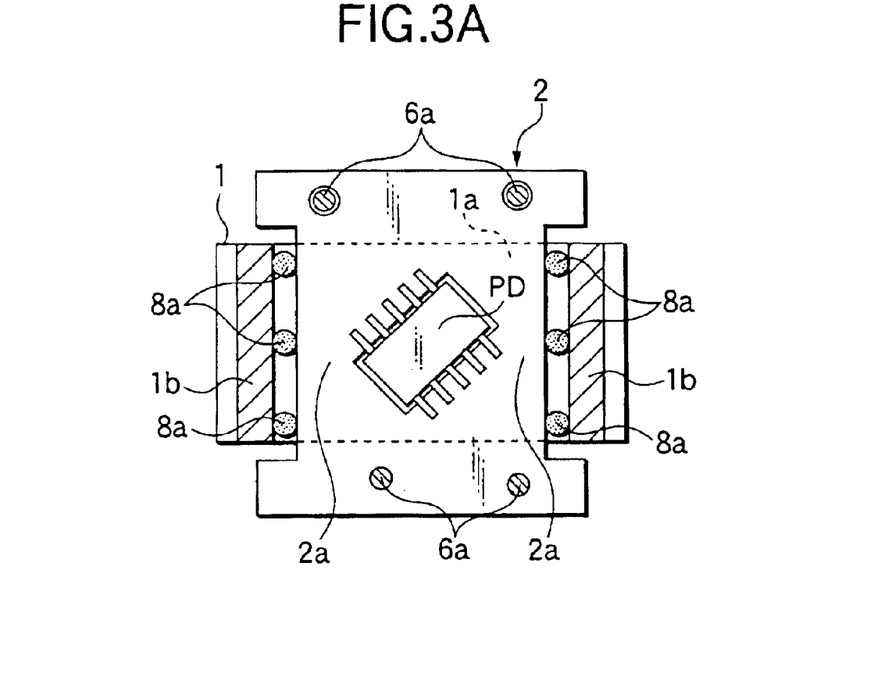
FIGS. 3A and 3B are fragmentary plan views illustrating modifications of temporary fixation and final fixation, respectively.
Figure 3B:
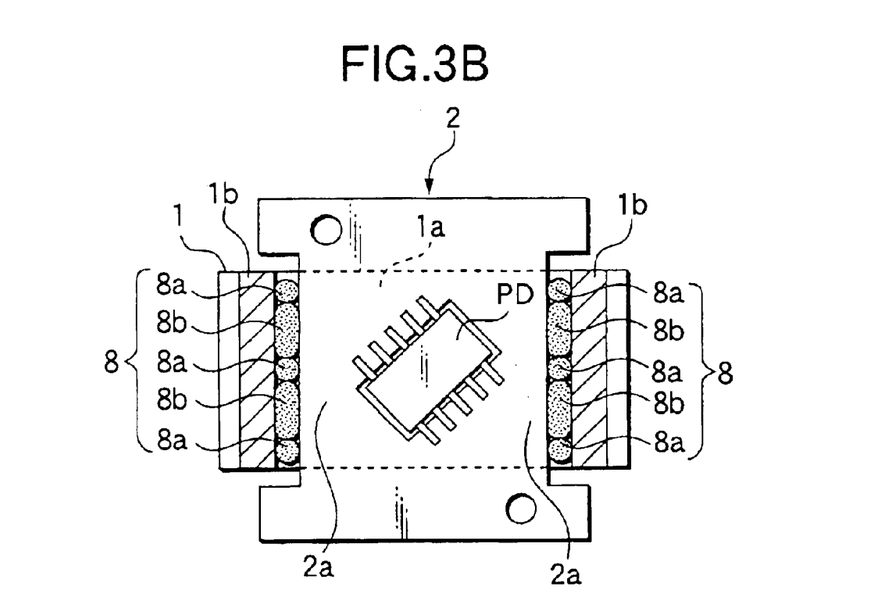

In the above-described embodiment, the arrangement provided is such that the ultraviolet curing adhesive 8a is applied to four spots each located between a corner of either side edge 2a of the plate 2 and each projecting portion 1b, the invention is not limited to the same. For instance, as shown in FIG. 3A, the ultraviolet curing adhesive 8a may be applied to a plurality of spots (six in this example) at predetermined intervals between either side edge 2a of the plate 2 and each projecting portion 1b to effect temporary fixation. Then, as shown in FIG. 3B, the thermosetting adhesive 8b may be applied to gaps other than those spots where the ultraviolet curing adhesive 8a was applied between either side edge 2a of the plate 2 and each projecting portion 1b so as to effect final fixation.

According to this construction, since a plurality of portions of either side edge 2a of the plate 2 are temporarily fixed firmly to the housing 1 by the ultraviolet curing adhesive 8a, the plate 2 can be positively supported so as not to move unexpectedly while the thermosetting adhesive 8b applied for final fixation is allowed to cure.

Figure 4A:
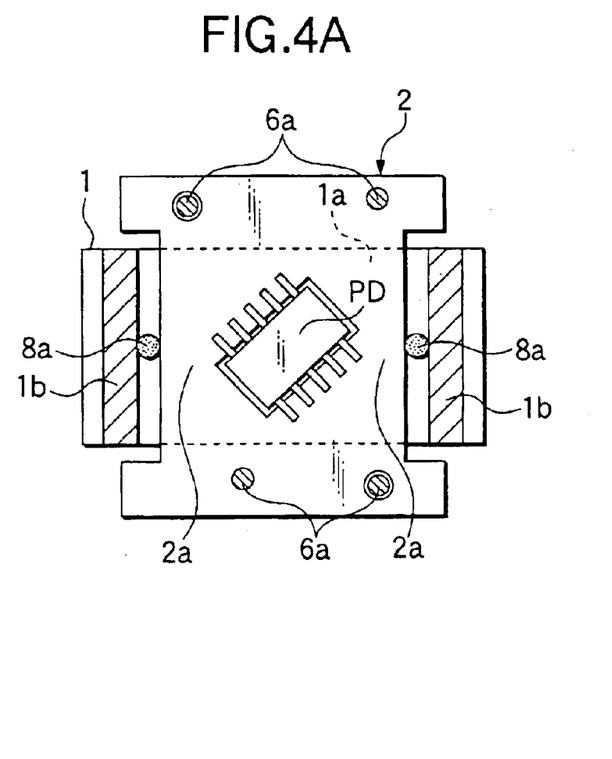
FIGS. 4A and 4B are fragmentary plan views illustrating further modifications of temporary fixation and final fixation, respectively.
Figure 4B:
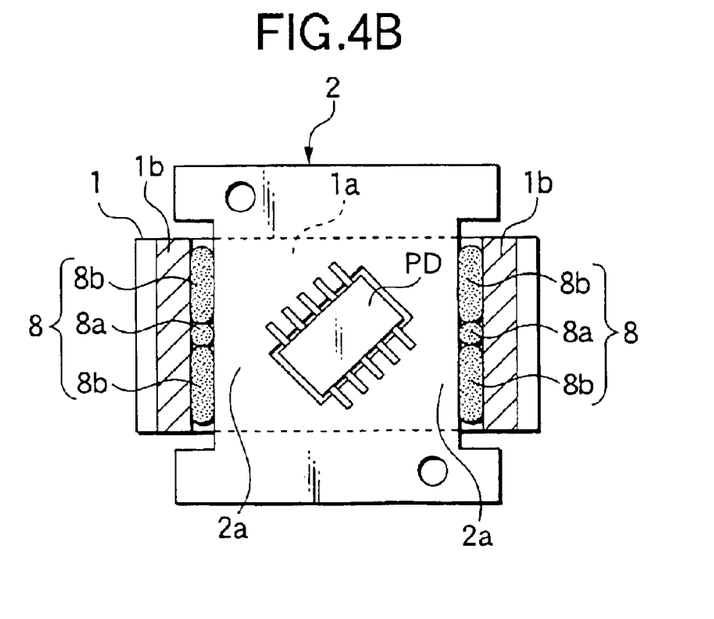

In addition, as shown in FIG. 4A, the ultraviolet curing adhesive 8a may be applied to two spots each located between a central portion of either side edge 2a of the plate 2 and each projecting portion 1b to effect temporary fixation. Then, as shown in FIG. 4B, the thermosetting adhesive 8b may be applied to four portions each located between each corner portion of either side edge 2a of the plate 2 and each projecting portion 1b so as to effect final fixation.

According to the above-described construction, since only the central portions of the side edges 2a of the plate 2 are temporarily fixed to the housing 1 by the ultraviolet curing adhesive 8a, and the amounts of the ultraviolet curing adhesive 8a applied are very small, it is possible to reliably overcome the drawback peculiar to the ultraviolet curing adhesive 8a that the degree of shrinkage due to the temperature change is large.

In the above-described embodiment, although a description has been given by citing as an example the case where the plate 2 with the photodiode PD is fixed to the housing 1, the invention is not limited to the same. For example, the invention is also applicable to a case where a plate 4 with a semiconductor laser LD is fixed to the housing 1.

According to the invention according to aspect 1, since the plate with a photodiode is temporarily fixed to the housing by the ultraviolet curing adhesive, there is no need to support the plate at the time of final fixation by the thermosetting adhesive, so that it is possible to overcome the drawback of the thermosetting adhesive that it takes time to cure. In addition, since the amount of ultraviolet curing adhesive applied can be reduced by the portion by which the thermosetting adhesive is applied, it is possible to overcome the drawback of the ultraviolet curing adhesive that the degree of shrinkage due to the temperature change is large. Thus by the combination of the two adhesives, the drawbacks of the two adhesives can be overcome, and the fixation of the plate with the photodiode to the housing can be effected speedily and accurately.

Further, since the four corners of the plate can be temporarily fixed positively to the housing by the ultraviolet curing adhesive, and the thermosetting adhesive is applied between the cured ultraviolet curing adhesive portions, the efflux of the thermosetting adhesive to the outside can be reliably prevented, and the plate can be finally fixed firmly to the housing.

According to the invention according to aspect 2, since the plate with an electronic component is temporarily fixed to the housing by the ultraviolet curing adhesive, there is no need to support the plate at the time of final fixation by the thermosetting adhesive, so that it is possible to overcome the drawback of the thermosetting adhesive that it takes time to cure. In addition, since the amount of ultraviolet curing adhesive applied can be reduced by the portion by which the thermosetting adhesive is applied, it is possible to overcome the drawback of the ultraviolet curing adhesive that the degree of shrinkage due to the temperature change is large. Thus by the combination of the two adhesives, the drawbacks of the two adhesives can be overcome, and the fixation of the plate with the electronic component to the housing can be effected speedily and accurately.

According to the invention according to aspect 3, since a plurality of portions of either side edge of the plate are temporarily fixed firmly to the housing by the ultraviolet curing adhesive, the plate can be positively supported so as not to move unexpectedly while the thermosetting adhesive applied for final fixation is allowed to cure.

According to the invention according to aspect 4, since only the central portions of the side edges of the plate are temporarily fixed to the housing by the ultraviolet curing adhesive, and the amounts of the ultraviolet curing adhesive applied are very small, it is possible to reliably overcome the drawback peculiar to the ultraviolet curing adhesive that the degree of shrinkage due to the temperature change is large.

According to the invention according to aspect 5, before the plate with the electronic component is finally fixed to the housing by the thermosetting adhesive, the plate is temporarily fixed by the ultraviolet curing adhesive in a state in which the plate is supported by the positioning arm. After the temporary fixation, the positioning arm can be immediately moved away from the plate, and it is unnecessary to maintain the support of the plate by the positioning arm until the curing of the thermosetting adhesive in a conventional manner, so that this arrangement excels in mass productivity. In addition, since the amount of the ultraviolet curing adhesive applied can be reduced by the portion by which the thermosetting adhesive is applied, it is possible to overcome the drawback of the ultraviolet curing adhesive that the degree of shrinkage due to the temperature change is large. Thus by the combination of the two adhesives, the drawbacks of the two adhesives can be overcome, and the fixation of the plate with the electronic component to the housing can be effected speedily and accurately.

What is claimed is:

1. An optical pickup, comprising
  a plate with a photodiode positioned with a slight interval with respect to a housing,
  a small amount of an ultraviolet curing adhesive applied between either side edge of said plate and said housing,
  the ultraviolet curing adhesive allowed to cure by application of ultraviolet rays thereto to temporarily fix said plate to said housing,
  an appropriate amount of a thermosetting adhesive applied between a central portion of said either side edge of said plate and said housing, and
  the thermosetting adhesive allowed to cure by heating so as to finally fix said plate to said housing.

2. An optical pickup, comprising:
  plate with a electronic component positioned with a slight interval with respect to a housing,
  a small amount of an ultraviolet curing adhesive applied between said plate and said housing,
  the ultraviolet curing adhesive allowed to cure by application of ultraviolet rays thereto to temporarily fix said plate to said housing,
  an appropriate amount of a thermosetting adhesive applied between said plate and said housing, and
  the thermosetting adhesive allowed to cure by heating so as to finally fix said plate to said housing.

3. The optical pickup according to claim 2, wherein
  the ultraviolet curing adhesive is applied to a plurality of portions at predetermined intervals between either side edge of said plate and said housing, and
  the thermosetting adhesive is applied to gaps other than portions where the ultraviolet curing adhesive has been applied between said either side edge of said plate and said housing.

4. The optical pickup according to claim 2, wherein
  the ultraviolet curing adhesive is applied a central portion of either side edge of said plate and said housing, and
  the thermosetting adhesive is applied between each corner portion of said either side edge of said plate and said housing.

5. A method of fixing a plate with an electronic component in an optical pickup, comprising the steps of:
  positioning a plate with an electric component at a predetermined interval from a housing as a positioning arm retaining said plate is moved in three-dimensional directions including back-and-forth, left-and-right, and vertical directions;
  applying a small amount of an ultraviolet curing adhesive between either side edge of said plate and said housing;
  allowing the ultraviolet curing adhesive to cure by application of ultraviolet rays thereto to temporarily fix said plate to said housing;
  moving said positioning arm from said plate;
  applying an appropriate amount of a thermosetting adhesive to gaps other than portions where the ultraviolet curing adhesive has been applied between said either side edge of said plate and said housing; and
  allowing the thermosetting adhesive to cure by heating so as to finally fix said plate to said housing.

6. An optical pickup, comprising:
  a plate with an electronic component positioned with a slight interval with respect to a housing;
  a small amount of an ultraviolet curing adhesive applied at a plurality of ultraviolet adhesive positions for temporarily fixing said plate to said housing; and
  an appropriate amount of a thermosetting adhesive for finally fixing said plate to said housing,
  wherein the thermosetting adhesive is applied between the ultraviolet adhesive positions using the ultraviolet curing adhesive as a positioning guide for the thermosetting adhesive.

7. A method of fixing a plate with an electronic component in an optical pickup, comprising the steps of:
  positioning the plate with the electronic component with a slight interval with respect to a housing;
  temporarily fixing the plate to the housing by applying a small amount of an ultraviolet curing adhesive at a plurality of ultraviolet adhesive positions; and
  finally fixing the plate to the housing by applying an appropriate amount of a thermosetting adhesive between the ultraviolet adhesive positions, using the ultraviolet curing adhesive as a positioning guide for the thermosetting adhesive.

8. An optical pickup, comprising:
  a plate with an electronic component positioned with a slight interval with respect to a housing;
  a small amount of an ultraviolet curing adhesive applied between said plate and said housing, the ultraviolet curing adhesive allowed to cure by application of ultraviolet rays thereto to temporarily fix said plate to said housing; and
  an appropriate amount of a thermosetting adhesive applied between said plate and said housing, the thermosetting adhesive allowed to cure by heating so as to finally fix said plate to said housing,
  wherein the ultraviolet curing adhesive is applied to a plurality of portions at predetermined intervals between either side edge of said plate and said housing, and
  the thermosetting adhesive is applied to gaps other than portions where the ultraviolet curing adhesive has been applied between said either side edge of said plate and said housing.

9. A method of fixing a plate with an electronic component in an optical pickup, comprising the steps of:
  positioning the plate with a slight interval with respect to a housing;
  temporarily fixing the plate to the housing by applying a small amount of an ultraviolet curing adhesive between the plate and the housing, and curing the ultraviolet curing adhesive by applying ultraviolet rays thereto; and
  finally fixing the plate to the housing by applying an appropriate amount of a thermosetting adhesive between the plate and the housing, and curing the thermosetting adhesive by heating,
  wherein the ultraviolet curing adhesive is applied to a plurality of portions at predetermined intervals between either side edge of said plate and said housing, and
  the thermosetting adhesive is applied to gaps other than portions where the ultraviolet curing adhesive has been applied between said either side edge of said plate and said housing.

* * * * *